United States Patent [19]

Cogan

[11] Patent Number: 4,954,095

[45] Date of Patent: Sep. 4, 1990

[54] CABLE EMPLOYING TUBULAR CONDUCTORS

[76] Inventor: Kenneth L. Cogan, 1609 Young St., Cincinnati, Ohio 45210

[21] Appl. No.: 317,631

[22] Filed: Mar. 1, 1989

[51] Int. Cl.⁵ ...................... H01R 25/00; H01B 11/00; H02G 15/02

[52] U.S. Cl. ....................................... 439/284; 174/27; 174/28; 174/115; 439/290

[58] Field of Search ............................ 174/27, 28, 115; 333/244; 439/284, 290, 291

[56] References Cited

U.S. PATENT DOCUMENTS

| | | | |
|---|---|---|---|
| 1,885,195 | 11/1932 | Green | 174/28 |
| 1,978,418 | 10/1934 | Dudley | 174/27 |
| 2,034,032 | 3/1936 | Green et al. | 174/27 |
| 2,173,717 | 9/1939 | Hobart | 174/2 |
| 2,257,259 | 9/1941 | Inoue | 174/27 |
| 2,351,520 | 6/1944 | Katzin et al. | 174/27 |
| 2,510,358 | 6/1950 | Wolf | 174/28 |
| 3,356,785 | 12/1967 | Yoshida et al. | 333/244 X |
| 3,651,243 | 3/1972 | Hornor et al. | 174/34 |
| 4,218,580 | 8/1980 | Pound et al. | 174/27 X |

*Primary Examiner*—Morris H. Nimmo
*Attorney, Agent, or Firm*—Jerome A. Gross

[57] ABSTRACT

The present invention consists of a cable especially suited to the transmission of audio-frequency signals, cable in which one or more of the conductors is tubular. The conductors are constructed and spaced so that the assembly approaches theoretical and empirical ideals of electrical signal transmission. Further, the cable's terminations are designed to enhance transmission by bringing the conductors into direct contact with the connectors on the devices with which the cable is used.

2 Claims, 2 Drawing Sheets

CABLE EMPLOYING TUBULAR CONDUCTORS

FIELD OF THE INVENTION

This invention pertains in general to the field of cable for electrical signal transmission, and in particular to the field of cable for the interconnection of audio apparatus.

BACKGROUND OF THE INVENTION

Much audio equipment is sold as separate components, for example, phonograph and compact disc players, amplifiers, and loudspeakers, and these components need to be connected to each other by cable. The cable needs to be flexible, so that the user may arrange his components as he wishes; cables should also, at least to some extent, be interchangeable, and to that end certain standard connectors are provided on both components and cables.

These cables fall into two basic categories: small-signal cables, carrying low-voltage, low-current signals (up to 2 volts at 250 milliamps or so), for example between phonograph and preamplifier, and between preamplifier and power amplifier; and large-signal cables, carrying up to several hundred watts, which applies only to connections between power amplifier and loudspeakers, and in rare cases to connections between sections of a loudspeaker/crossover network when the network is exposed. Both of these kinds of cables are usually single-ended dipole cables, that is, they consist of two conductors, one carrying the positive signal and the other carrying both the negative signal and ground. The small-signal cables are usually shielded against radio-frequency interference and external hum fields.

Each of these kinds of cable has a conventional termination. Small-signal cables and the components to which they are connected use a mating male/female pair (male on cable, female on component) of the type commonly called "RCA" connectors. Large-signal cables are generally terminated either with bare wire or with spade lugs, and these terminations are fastened to amplifiers and loudspeakers with binding posts or other simple screwed or spring-loaded terminals.

Research and experience have shown that the cable used between components can have a significant impact on the overall sound of a system of high-fidelity components. For that reason manufacturers and audiophiles seek electrically optimal cables, cables adding the least possible distortion and coloration of their own to the musical signal as it passes through an audio system. Many types of distortion are recognized, although it is not always known why or how a certain kind of signal distortion produces a certain acoustic or psycho-acoustic effect.

Most audio cable is composed of bundles of stranded wires in variously twisted and braided configurations. At least two kinds of distortion are, however, inherent in stranding. Microphony, or electrically induced motion among the strands, produces spurious induction among the strands, which is known empirically to blur the mid-upper frequency audio range. Secondly, small-diode or rectification effects arise from imperfect contact among the strands, producing harshness audible in the higher frequencies of the audio bandwidth.

Further, skin effect is difficult to eliminate from stranded wire designs. Skin effect occurs when signals of different frequencies travel at different depths in a conductor—higher frequencies penetrate less deeply—and thus undergo relative phase shift, which distorts the time-coherency of the audio signal. There are studies which suggest that the techniques used to eliminate skin effect in stranded-wire designs—such as using very fine wires to maximize conductor surface area—do not in fact eliminate skin effect from the uppermost octave of the audio band.

Most cables' conductors are enclosed within some kind of plastic insulator or dielectric, which serves in part to hold stranded bundles together. Because of their contact with the conductor strands, these solid dielectrics compound the problem of microphony. Solid dielectrics also increase a cable's capacitance by energy storage effects, which, especially in a long cable run, can create stability problems in wide-band audio electronics.

Low resistance is important in cables used between phonograph and preamplifier where low source impedance moving-coil cartridges are used; it is also important in cables used between power amplifiers and loudspeakers, since the resistance connecting cable compromises the amplifier's damping factor. Thus to counter resistance, the conductors of many cables are made large in cross-section.

Along with the conductor's increased diameter, however, comes increased internal inductance, causing phase shift or even amplitude roll-off in the higher frequencies of the audio band. If positive and negative conductors are brought close together, their external (also called mutual) inductance counters the internal inductance, but this close spacing of the conductors also gives rise to increased capacitance in the cable. Conductors of large diameter also exhibit increased skin effect.

In their efforts to overcome these problems, designers use an enormous variety of materials and methods, tuning out distortions one by one. One popular and simple attempt at purity is the use of "solid-core" wire, or individual strands (one per pole) of uninsulated copper wire from 0.5 to 1 mm in diameter. Such a small diameter in a conductor evades skin effect, but increases resistance. If the skin effect is accepted in a strand made heavier for low resistance, inductance increases. If the internal inductance is countered by external inductance, capacitance increases—so while leaving the problems of stranding and insulators behind, solid-core users still carry heavy loads of electrical trade-offs.

A further signal distortion in conventional cables arises from their connectors. These connectors are usually made of metals less conductive than copper, and further are attached to cables either with solder—itself a poor conductor—or by compression fittings. Both compression fittings and solder joints are subject to failure.

One approach to optimizing certain electrical characteristics that has been used in audio cable is the simulation of a tubular conductor by means of stranded wires, usually surrounding a slender non-conductive cylindrical former, for example as the outer conductor in coaxial configurations. While this technique does reduce the inductance of the wire bundle versus the same bundle formed into conventional conductor of twisted strands, the other problems of stranded wire mentioned above remain.

Solid-wall hollow structures made of copper have been used in microwave and other high-frequency technology. Solid-walled hollow structures of both rectangular and circular cross-section are used as waveguides for microwave transmissions; although the structures also conduct current, their dimensions are chosen for their waveguide capabilities. Solid-wall hollow conductors are used in some high-frequency applications in fixed positions on circuit boards, in part to permit coolant to be passed through them. Hollow structures having extremely thin walls, for example of deposited film, are believed to have been used as conductors of very high frequencies. Tubular conductors having segmented walls are used in high-power transmission.

Because of size, lack of flexibility, or lack of durability, none of these hollow conductors lends itself to use in cable for transmission of audio-frequency signals.

SUMMARY OF THE INVENTION

The inventor knows of no application in which tubular conductors having solid, not stranded, walls and having size, durability, and flexibility such that they can be repeatedly bent by hand have been used.

In the following description of the present invention, the term "hollow tubular conductor" is meant to describe a tube having a solid, continuous wall along its length. In this description the term "cable" is meant to describe a product flexible enough and sized so that it can be manipulated by hand, without tools; can be bent repeatedly without suffering mechanical or electrical damage; and is convenient to be used with audio equipment sold in consumer markets.

The present invention is a cable which by unconventional means corrects the electrical shortcomings of typical known audio cables described in the section on prior art. With proper attention to electrical and mechanical considerations, conductors made of hollow copper tubing form the foundation of a novel and superior audio cable.

When correctly sized and spaced, hollow tubular conductors have nearly ideal electrical characteristics for use in the audio band. Cables of useful lengths made of these conductors exhibit inductance, capacitance, and resistance low enough to be insignificant in audio applications; at the same time they are free of the microphony and rectification effects characteristic of stranded cables; and they are constructed to minimize skin effect.

Careful specification of the dimensions and the means of supporting the tubing make it possible to meet the demands of flexibility, ruggedness, and size that are important in practical use of the cable.

This invention also uses the hollow conductor as part of a novel cable termination which brings the conductor into direct contact with other audio components, eliminating extra parts with their mechanical shortcomings and their sonic colorations.

DESCRIPTION OF PREFERRED EMBODIMENTS

Figure 1:
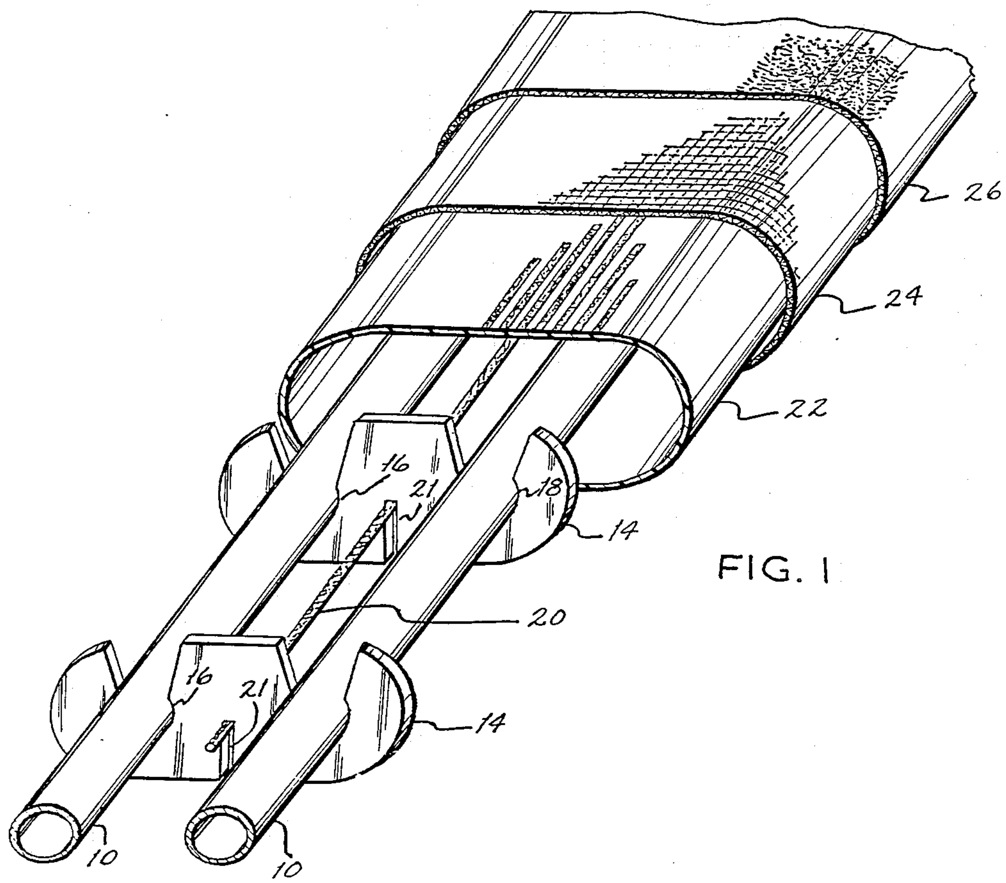
FIG. 1 shows in orthographic view of a portion of a dipole cable made according to the present invention.

Referring to FIG. 1, which comprises a portion of dipole cable made according to this invention, the parts shown comprise hollow tubular conductors 10, nonconductive spacers 14, string 20, insulating sheathing 22, grounded shielding 24, and knitted cable covering 26.

Hollow tubular conductors 10 are made in this embodiment of soft-annealed copper tubing, whose dimensions are hereinafter described. Their diameters are equal.

Hollow tubular conductors 10 are held side-by-side and parallel to each other within acceptable tolerances by a series of nonconductive spacers such as 14. Spacers are made of molded nylon. The spacers are placed at intervals averaging 1.5 inch along the length of the cable to within a certain distance from the cable ends. Said distance from cable ends may vary between 3 inches and 4.5 inches, depending on the chosen means of cable termination as hereinafter described.

Spacer openings 16 and 18 comprise curved surfaces having diameters coinciding with the diameters of conductors 10. When spacers are placed on conductors 10, spacer openings 16 and 18 maintain a regular distance between conductors 10 such that when the cable is bent the distance between the conductors remains within acceptable tolerances as hereafter described.

String 20 is knotted to the last spacer at one end of the cable. String 20 is passed through and fastened with adhesive to spacer slots 21 until the last spacer at the other end of the cable is reached, where the string is knotted to that end spacer. By this means the average distance of 1.5 inch between each adjacent pair of spacers is maintained.

The perimeter of spacers 14 is shaped so that it supports insulating sheathing 22 at a regular distance from conductors 10, thereby forming and maintaining a dielectric which is mostly air around and between conductors 10. Insulating sheathing 22 is made of a braided fiberglass tubing. Insulating sheathing 22 encloses the conductors/ spacers/string assembly heretofore described from the last spacer at one end of the cable to the last spacer at the other end of the cable. Insulating sheathing 22 is fixed to the last spacer at each end of the cable by adhesive tape.

The assembly of conductors, spacers, string, and insulating sheathing heretofore described is enclosed in grounded external shielding 24. Shielding 24 is made of braided copper tubing. Shielding 24 extends from the last spacer at one end of the cable to the last spacer at the other end of the cable and i fixed to the last spacer at each end of the cable by adhesive tape. Shielding 24 is connected to the conductor chosen as the negative/-ground by the conventional means of a conductive wire soldered at one of its ends to the shielding and at the other to the conductor chosen as negative/ground.

Knitted cable covering 26 covers the dipole cable portion shown in FIG. 1.

Figure 2:
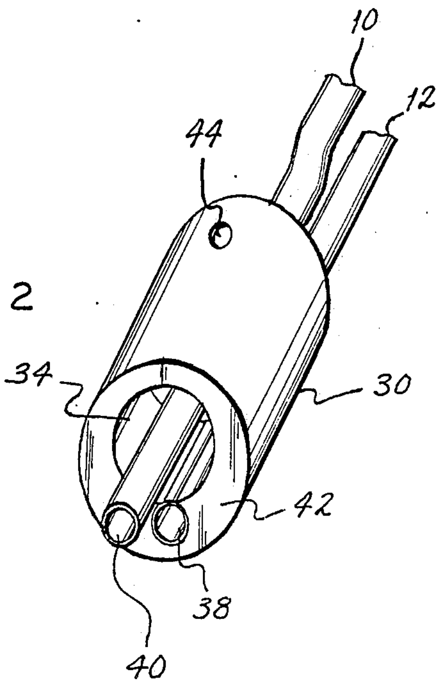
FIG. 2 shows in orthographic view a member which is included in a method for terminating the cable portion shown in FIG. 1.
Figure 3:
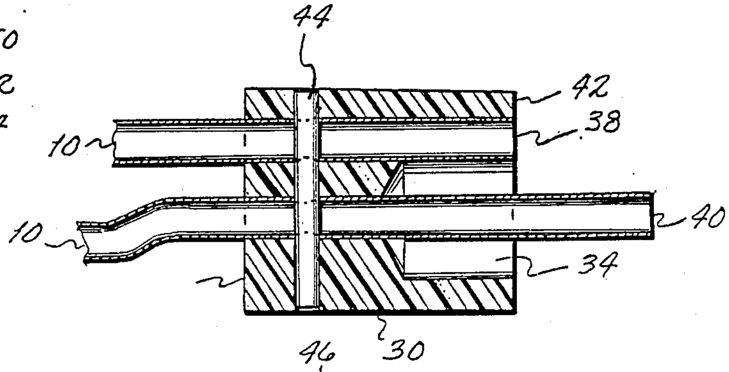
FIG. 3 shows a longitudinal section through the centerline of the member shown in FIG. 2.
Figure 4:
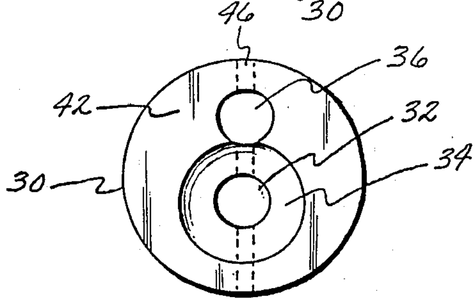
FIG. 4 shows one face of the member shown in FIG. 2.

Referring to FIGS. 2, 3, and 4, these figures show a method for terminating the cable portion of FIG. 1. This method of terminating a cable is used at both ends of a cable built like the cable portion shown in FIG. 1.

In FIGS. 2 and 3 one of the hollow tubular conductors has been designated 10 and the other has been designated 12, for this is the only case of the present invention where the two hollow tubular conductors are treated differently. Their diameters remain equal. Either of the conductors 10 of FIG. 1 may be chosen for conductor 12 in FIGS. 2 and 3.

The parts shown in FIGS. 2, 3, and 4 include cylindrical plug 30 and hollow tubular conductors 10 and 12. Plug 30 is a nonconductive terminal connection spacer member which in this embodiment is made of a substantially rigid insulating plastic, such as known by the trademark "Delrin," DuPont's moldable acetal resin. In this embodiment Plug 30 has a length of 0.75 inch and a diameter of 0.625 inch. Plug 30 has a lengthwise cavity 34 extending from the plug outer end face 42 for part of the plug length, along the axis of which is drilled lengthwise hole 32 extending through the plug inner end wall or back face 48 so that it securely holds hollow tubular conductor 10 in the center of drilled cavity 34, which has the same axis as hole 32. Plug 30 is also drilled along lengthwise hole 36 so that it securely holds hollow tubular conductor 12 at a spacing substantially equal to the radius of the cavity 14 plus the greater part but not all of the radius of the tubular conductor 12, the bore or hole 36 interrupting the wall of the cavity 34.

The axes of drilled hole 36 and cavity 34 are located at a spacing substantially equal to the radius of the cavity 14 plus the greater part but not all of the radius of the tubular conductor 12, the bore or hole 36 interrupting the wall of the cavity 34 so that hole 36 and cavity 34 intersect along their lengths, as can be seen in FIG. 4, so that the end 38 and a part of conductor 12 are exposed in cavity 34 when conductor 12 is inserted in hole 36, as can be seen in FIG. 2.

The end 38 of conductor 12 is flush with the front face 42 of plug 30. The end 40 of conductor 10 projects from cavity 34 so that end 40 extends forward approximately 0.375 inch from the face 42 of plug 30, so that it may enter and make contact with the central conductive port 50 of the female connector 49, to be described.

Conductor 10 is bent after having passed through the last spacer 14 of FIG. 1 in order to conform to the spacing of the drilled hole 32, because the spacing of holes 32 and 36 is closer than the spacing of spacer openings 16 and 18 in this embodiment.

Rod 44, made in this embodiment of nylon, has a diameter of approximately one half the diameter of a hollow tubular conductor 10 or 12 and a length equal to the diameter of plug 30. A hole 46 having diameter and length corresponding to those of rod 44 is drilled in plug 30 perpendicular to and intersecting holes 36 and 32. A hole corresponding to hole 46 is drilled in conductors 10 and 12 after the conductors have been placed in their positions in the holes 36 and 32 of the plug 30. Rod 44 is placed in the perpendicular hole 46 to hold conductors 10 and 12 in their positions, and rod 44 is fixed in place with adhesive.

The space between the last spacer 14 on the cable portion shown in FIG. 1 and the back face 48 of plug 30 is filled with potting compound.

Figure 5:
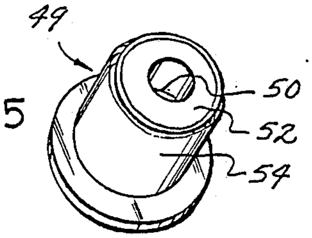
FIG. 5 shows a typical female connector used in audio products.

Referring to FIG. 5, what is shown is a typical conventional female connector used in audio apparatus. The female connector 49 comprises a conductive metal central connection port 50, an insulator 52, and a conductive metal cylindrical shell portion 54 to which contact may be made.

The nonconductive terminal connection member or plug 30 shown in FIG. 2 mates with the female connector 49 of FIG. 5. Plug 30 holds the bare ends of hollow tubular conductors 10 and 12 at a spacing which corresponds to the spacing between central conductive metal connection port 50 and conductive metal cylindrical shell contact surface 54 of the female connector.

The end 40 of hollow tubular conductor 10 is so sized as to fit securely within the central connection port 50 of the female connector. The end 40 of hollow tubular conductor 10 is inserted into central connection port 50, making contact with its conductive inner end. Upon such insertion, the cavity 34 of plug 30 embraces the outside conductive portion 54 of the female connector, and the bare side surface of hollow tubular conductor 12 comes into contact with conductive metal cylindrical shell portion 54 of the female connector 49 at the exposed area where cavity 34 and hole 36 intersect. In this manner, both conductors of the dipole cable make direct connection with the two conductive parts of the female connector.

Following are considerations and specifications made by the inventor during design and construction of the preferred embodiment of the invention herein illustrated and described.

Hollow tubular conductors 10 and 12 are made of oxygen-free soft-annealed copper. Two sizes of tubular conductors have been used. One has a diameter of 0.125 inch and a wall thickness of 0.015 inch; one has a diameter of 0.125 inch and a wall thickness of 0.010 inch.

These hollow tubular conductors have the following characteristics: they are highly conductive; they are readily fabricated using conventional tubing dies; they can be bent repeatedly without mechanical or electrical failure, provided that the bends are gently curved rather than acute; they obviate problems of stranded conductors used in audio cables, namely, microphony and rectification effects; their cross-sectional area provides low resistance; their tubular shape and dimensions provide low internal inductance.

A tubular conductor of the dimensions and material described in these preferred embodiments also eliminates skin effect within the audio band. The skin depth for copper is given by d=0.0661 {f where d is the penetration depth in a solid conductor of round cross-section, measured in meters; and f is the frequency of interest. The penetration depth yielded by this equation for a signal of 20,000 Hz, the highest frequency in the audio range, is 0.000467 meter, or 0.018 inch. Although the formula for the penetration depth in a tubular conductor is a quite complex one which yields a somewhat different value, the difference is such that so long as the wall thickness does not exceed the value given for the penetration depth in a solid conductor of round cross section, then there will be no skin effect present up to the frequency of interest.

Spacers 14 in this embodiment hold the conductors at a center-to-center distance of 0.4375 inch, within a tolerance of 0.0625 inch. These spacing is wide enough to allow uniform current conduction through the cross-sections of conductors 10, by the rule stating that current conduction in a pair of conductors is uniform when the conductors are more than 2.5 diameters apart.

In that the internal inductance of the cable of this invention is low, external inductance need not be used to counter internal inductance, which is an additional factor in the spacing of the two conductors, for they are spaced by a sufficient distance that external inductance is not introduced. Because external inductance is not used to counter internal inductance, cable capacitance is also minimized in this invention.

Experimentation with this invention has shown that the same design which makes an improved cable between audio components also makes a good cable for use between video components.

As various modifications may be made in the constructions herein described and illustrated without departing from the invention, it is intended that all matter contained in the foregoing description or shown in the drawings shall be interpreted as illustrative rather than limiting.

I claim:

1. In combination a cable and a nonconductive terminal plug for use in a high-fidelity sound or video system for making electrical connection with a conventional female connector of the type having a central internal connection port and a conductive external cylindrical surface projecting thereabout and insulated therefrom, said cable comprising a first and a second cylindrical tubular conductor, said first conductor being of such outer diameter as to fit within and make conductive contact with the internal connection port of a conventional female connector, and means to hold said conductors spaced apart and provide a dielectric between them, and said nonconductive terminal plug, including outer and inner end faces, a cylindrical cavity extending inward from said outer end face and sized to receive the cylindrical surface of the female connector, the cavity terminating short of said inner end face, there being a first longitudinal bore through said plug inner end face aligned with the axis of the cavity, and a second longitudinal bore through said plug inner end face, parallel to the first bore, said second bore being at a spacing from the first bore substantially equal to the radius of the cavity plus the greater part but not all of the radius of said second tubular conductor whereby said second bore intersects with and interrupts the cylindrical cavity wall, said bores being of such diameter as to receive and hold said tubular conductors, one of said tubular conductors extending through said first bore and along the axis of said cavity and projecting outwardly therefrom beyond said outer end face, the second of said tubular conductors extending through said second bore substantially to but not beyond the outer end face of said body, with its side surface exposed at and along said interruption of the cavity wall, whereby the exposed portion of the side surface of said second conductor makes conductive contact with the external cylindrical surface of such female conductor as the projecting end of said first conductor is inserted into and makes conductive contact with the central connection port of such female conductor.

2. A cable as defined in claim 1, the plug inner end further having a pin-receiving bore extending substantially diametrically thereacross and intersecting said first and second longitudinal bores, and pin-like retention means in said bore to retain said tubular conductors in said first and second longitudinal bores.

* * * * *

UNITED STATES PATENT AND TRADEMARK OFFICE
CERTIFICATE OF CORRECTION

PATENT NO. : 4,954,095

DATED : September 4, 1990

INVENTOR(S) : Kenneth L. Cogan

It is certified that error appears in the above-identified patent and that said Letters Patent is hereby corrected as shown below:

Column 4, line 52, delete "i" and substitute ---is---.

Column 5, line 18, after "12" delete the remainder of the sentence.

Signed and Sealed this

Eleventh Day of February, 1992

*Attest:*

HARRY F. MANBECK, JR.

*Attesting Officer*

*Commissioner of Patents and Trademarks*